(No Model.)

M. F. O'CALLAGHAN.
COOKING UTENSIL.

No. 578,765. Patented Mar. 16, 1897.

WITNESSES
John Buckler
C. Gerst

INVENTOR
Mary Francis O'Callaghan
BY
Edgar Vatette
ATTORNEYS.

UNITED STATES PATENT OFFICE.

MARY FRANCIS O'CALLAGHAN, OF WATERVLIET, NEW YORK.

COOKING UTENSIL.

SPECIFICATION forming part of Letters Patent No. 578,765, dated March 16, 1897.

Application filed December 19, 1896. Serial No. 616,241. (No model.)

*To all whom it may concern:*

Be it known that I, MARY FRANCIS O'CAL-LAGHAN, a citizen of the United States, residing at Watervliet, in the county of Albany and State of New York, have invented certain new and useful Improvements in Cooking Utensils, of which the following is a full and complete specification, such as will enable those skilled in the art to which it appertains to make and use the same.

This invention relates to cooking utensils, and particularly to that class thereof employed for boiling vegetables, meats, and other articles, and the object thereof is to provide a vessel of this class in which a number of different articles may be cooked at the same time.

The invention is fully disclosed in the following specification, of which the accompanying drawings form a part, in which—

Figure 1:
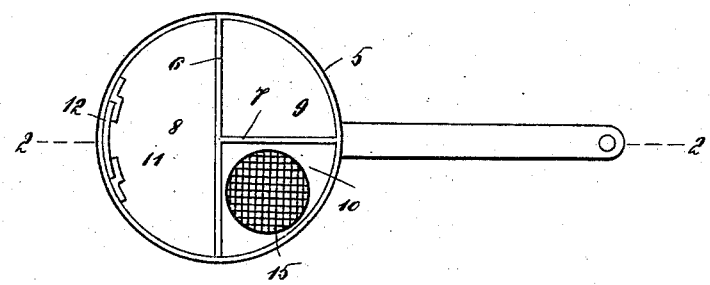
Figure 2:
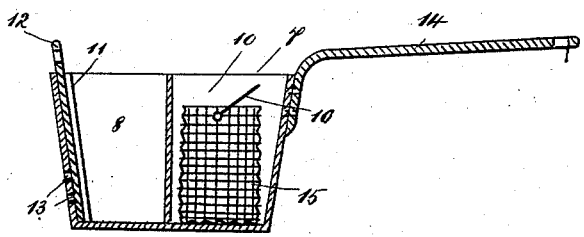

Figure 1 is a plan view of my improved cooking utensil, and Fig. 2 a central vertical section thereof.

In the drawings forming part of this specification, the separate parts of my improvement are designated by numerals of reference throughout both views, and in the practice of my invention I provide a utensil 5, which is of the general form shown in Figs. 1 and 2, and which is open at the top and closed at the bottom, said utensil being slightly larger at the top than at the bottom.

The utensil 5 is provided with a central transverse partition 6, whereby two similar compartments are formed, and one of said compartments is divided by a transverse partition 7, and by means of the partitions 6 and 7 three chambers or compartments are formed, as shown at 8, 9, and 10. The chamber or compartment 8 is much larger than the chambers or compartments 9 and 10, and secured to the outer side walls of the larger compartment 8 are upright keepers 11, in which is mounted a slide 12, and between the keepers 11 and near the bottom of the utensil are formed perforations or openings 13. The vessel or utensil 5 is also provided at one side with a handle 14, and I also provide a wire receptacle 15, which is adapted to be placed in one of the chambers or compartments and to receive various vegetables or articles to be cooked, the object of this arrangement being to provide means whereby said vegetables or other articles may be quickly removed from the vessel, the said vegetables or other articles being placed in said receptacle and then placed in one of the compartments or chambers, as shown in the drawings.

The operation will be readily understood from the foregoing description when taken in connection with the accompanying drawings and the following statement thereof. The smaller compartments or chambers 9 and 10 are intended to receive different vegetables, while the larger compartment thereof is intended to receive meat, and the object of the slide 12 and the perforations or openings 13 is to provide means for discharging the water from the chamber or compartment 8 without removing the cooking utensil or without turning the same over.

It will be understood that either of the compartments or chambers may be used independently of the others by placing water in all of them, and it will also be understood that all of said chambers or compartments may be used at the same time, if desired.

The wire receptacle 15 is provided with a handle or bail 16, and it will thus be seen that I accomplish the object of my invention by means of a device which is simple in construction and operation and which is well adapted to produce the result for which it is intended.

Having fully described my invention, I claim as new and desire to secure by Letters Patent—

The herein-described cooking utensil, the same consisting of a vessel or receptacle which is provided with vertical partitions whereby a plurality of chambers or compartments are formed, one of said compartments being provided with upright keepers secured to or formed on its walls, and a slide mounted therein, the wall of a vessel near the bottom thereof, and between said keepers being provided with perforations or openings which are adapted to be closed by said slide, substantially as shown and described.

In testimony that I claim the foregoing as my invention I have signed my name, in presence of the subscribing witnesses, this 14th day of December, 1896.

MARY FRANCIS O'CALLAGHAN.

Witnesses:
M. STANISLAUS DALY,
M. TERESA FITZGERALD.